United States Patent Office 2,720,500
Patented Oct. 11, 1955

2,720,500

POLYESTERS FROM POLYCARBOXYLIC ACIDS, POLYHYDRIC ALCOHOLS, AND GLYCIDYL ETHERS OF MONOHYDROCARBON SUBSTITUTED MONOHYDRIC PHENOL

William P. Cody, Lombard, Ill., assignor to Alkydol Laboratories, Inc., Cicero, Ill., a corporation of Illinois No Drawing. Application October 17, 1952, Serial No. 315,429

12 Claims. (Cl. 260—47)

The present invention relates generally to the manufacture of resinous materials suitable for use as clear coatings and enamel bases of the heat-curing type. In particular it relates to a resinous condensation product having heat-setting properties per se, and having improved properties resulting from the addition of a cross-linking promoter.

It has long been realized that baking finishes for refrigerators, kitchen cabinets, automobiles, washing machines, ironers, dryers, deep freezers, hot water and room heaters having a multitude of short-comings, for instance, slow heat curing, softness of the enamel, yellowing in the light and dark to different degrees, loss of luster on ageing, poor hardness and mar resistance, lack of alkali resistance, embrittlement at low temperatures, and gradual deterioration on ageing. All these defects can be traced back to the oily constituent of the vehicle. The present-day finishes contain vegetable oils of the non-, semi- and drying types, such as coconut oil, castor oil, dehydrated castor oil, soyabean oil, safflower oil, or their fatty acids, or mixtures of the oils and their fatty acids. To produce these coating resins, the oils or fatty acids are incorporated into polyhydric alcohol-phthalate esters. To improve heat curing, gloss, hardness and light fastness of these oil-modified alkyd resins, they are intermixed with amine resins, such as certain alkylated urea-formaldehyde or melamine-formaldehyde resins. The improvements achieved are far from satisfactory; and relatively poor gloss and gloss retention, poor color and color retention, lack of chemical resistance and lack of hardness are still pronounced.

The present invention aims to overcome these defects by providing an improved resinous condensation product lacking in vegetable oil and in drying oil, or more specifically the glycerides of fatty acids and the corresponding free fatty acids, where such fatty acid has more than 10 carbon atoms in the aliphatic chain. By the present invention there may be formed a product which is per se a heat-curing composition, and which is comparable to the oil-modified alkyd resins in exhibiting improved coats when cured in the presence of a cross-linking promoter.

Aside from the technological improvements and advantages of the present invention, there are valuable economic aspects. In the manufacture of resin materials involving agricultural products, such as the vegetable oils, there have been many problems arising because of uncertain supplies and fluctuating costs of such oils. The present invention eliminates these problems.

It is the general object of the invention to provide a polyester type of resin, which is useful per se and as an intermediate resin advantageously reactive when heated in the presence of a wide variety of cross-linking promoters in heat-curing.

It is a particular object of the invention to provide a stable coating composition or base combining said polyester resin and said cross-linking promoter.

It is a particular object of the invention to form a resinous ester from selected organic dibasic acid, selected polyhydric alcohol, and certain epoxy compounds.

It is also an object of the invention to provide stable compositions including said resinous ester and a cross-linking promoter.

Numerous other and ancillary objects and advantages of the present invention will become apparent from the following description and explanation of the invention.

In carrying out the invention a wide variety of ingredients may be present in the initial condensation. The essential ingredients are selected dibasic acid or an anhydride of such, selected polyhydric alcohol, and a certain type of epoxy compound. Each type of said three ingredients may be a single compound or a mixture. Other ingredients may be present to minor extents as modifiers, either reactive or inert. One function of a modifier is plasticization. Another function is reaction with the essential esterifying factors. Still another function is the introduction of unsaturation, giving to a slight degree drying properties akin to the drying properties of oil-modified alkyd resins. The condensation reaction is one effected by heating the ingredients. A catalyst is not essential. A solvent vehicle for the reaction mass may be used but it is not at all required.

*Dibasic acid.*—A wide variety of dibasic acids may be used, and in appropriate cases the anhydrides of such are equally effective. Not all dibasic acids have anhydrides. The group includes aromatic, aliphatic, straight-chain, cyclic aliphatic, saturated and unsaturated compounds.

Phthalic acid and its anhydride are common commercial dibasic acids which may be employed. Its meta and para isomers, respectively known as isophthalic acid and terephthalic acid may be used. These are not known to form anhydrides. These three isomeric forms are aromatic, but the saturated-ring derivatives of the phthalic acids and any anhydride of them, such as tetrahydrophthalic acid and its anhydride, are included herein as saturated cycloaliphatic dibasic acid compounds.

Other saturated aliphatic dibasic acid compounds are the open-chain compounds having two terminals —COOH groups and from 4 through 10 carbon atoms, and their anhydrides. These are a well-known series of acids: succinic, glutaric, adipic, pimelic, suberic, azelaic, and sebacic acids. All form anhydrides with themselves and with each other.

Among the dibasic material for the present invention are dibasic compounds selected from the group consisting of fumaric, maleic, itaconic and aconitic acids and any of their anhydrides, and saturated or unsaturated addition products of such selected dibasic compound with compounds having at least one ethylenic double bond. When the last mentioned compounds have conjugated double bonds, the product is known as a Diels-Alder reaction product.

The best results have been obtained by using for the polyester a mixture of phthalic acid or any of its said derivatives and one or more of the saturated dibasic acids having from 4 to 10 carbon atoms, or anhydrides of such.

*Polyhydric alcohol.*—The polyhydric alcohol components for the polyester may be selected from the group consisting of ethylene glycol, glycerol, diglycerol, sorbitol, and mono-, di- or tri-pentaerythritol, but the most satisfactory results consistent with the main objectives obtain only when the polyhydric alcohol includes one or more of the said glycerols or pentaerythritols. The technical grade of pentaerythritol contains said three forms.

*Epoxy compounds.*—Epoxy compounds are those having the essential grouping

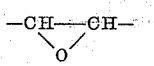

or

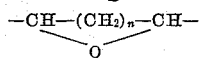

Examples are epoxy ethane (the anhydride of glycol); 1.3-epoxypropane; and epoxypropanol known also as glycidol. Glycidol has the formula

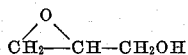

Its terminal —OH group may react to form glycidyl ethers, which remain epoxy compounds for use in the esterification reaction of the present invention. Glycidyl ethers with monohydroxy benzene having a single hydrocarbon substituent selected from the group consisting of alkyl, aryl and aralkyl radicals are valuable reactants for the present invention. Such monohydric phenols may be used as para tertiary butyl phenol, para tertiary amyl phenol, para octyl phenol, para nonyl phenol, para capryl phenol, para benzyl phenol, and para phenyl phenol. It is to be understood that C. P. or technical grades of these may be used, and that the technical grades are a mixture of two or more of the ortho, meta and para isomers, all of which participate in the reaction.

Condensation of any selected one or more of the said dibasic acids, of any selected one or more of the said polyhydric alcohols, and any selected one or more of said epoxy compounds, is effected by heating with progressive reduction of the acid number as the ester is formed. Reflux and distillation apparatus are preferably employed, especially where solvent vehicle is present. Modifiers may be present also.

As reactive modifiers there may be used certain saturated and unsaturated monobasic acids having not more than 10 carbon atoms up to approximately 15 parts per 100 parts by weight of the reaction mass, excluding solvent. The —COOH group participates in ester formation and any unsaturation provides drying capacity in the finished but uncured resin, without the accompanying disadvantages accruing when using drying oils or their fatty acids. Examples of monobasic acid modifiers are benzoic acid, salicylic acid, acrylic acid, methacrylic acid, crotonic acid, isocrotonic acid, and any of their anhydrides with themselves or each other.

As non-reactive ingredients any compatible plasticizer may be present during the condensation. So present and inert, it modifies the character of the condensation and provides toughness or softness as desired. Up to 15 parts per 85 parts of the essential ester-forming ingredients may be used. Suitable ones are dibutyl phthalate, dioctyl phthalate, glycol esters of adipic acid or sebacic acids, tricresyl phosphate, and triphenyl phosphate.

In carrying out the esterification the mass is heated to a temperature in the range from 350° to 450° F. and so maintained until the standard acid number, determined by titration of a sample with standardized KOH solution is in the range from 0 to 20, and until it has at 77° F. a Gardner-Holdt viscosity in the range from T to $Z_3$, as measured in a 50%-solids solution in xylene. It is preferred to heat initially to about 400° F., and then to conduct the reaction at any temperature in the range from 350° to 450° F. which permits the reaction to finish in from three to four hours. Time and temperature are not critical. The end point of acidity is critical with respect to the nature of the polyester. The end point of viscosity is only a practical consideration so that the polyester may be compounded to workable compositions of accepted standards.

When no solvent is present the reaction mass is usually a viscous balsam-like fluid at normal temperature. It is stable against air and light. At elevated temperatures of 300° to 400° F. a coating layer of it converts slowly to a pale, elastic film. Thus, reactivity at high temperature indicates the desirability of stopping the esterification reaction at an acidity between 0 and 20, in order to avoid overcuring of the resinous ester in process of producing it.

The acid number for the condensation is preferably in the range from 0 to 10, for more universal usefulness of the resin. As a resin itself or for varnishes free from pigment, the acid number may be in the range from 0 to 20. Where certain basic pigments are used, unsatisfactory results obtain in employing a polyester having an acid number in the range from 10 to 20. The acidity of the resin slowly reacts on standing with the basic pigments. Accordingly, resins reacted to an acid number from 0 to 10 are useful advantageously with all kinds of pigments to provide acceptable shelf life.

Where the cross-linking promoter is basic, for example, the butylated urea-formaldehyde resin, the acid number of the polyester is preferably in the range from 0 to 10. Polyester resins having an acid number in the range from 10 to 20 slowly react with the amine promoter causing gelling of prepared compositions. This may occur in a few weeks. But when the acid number is not over 10 such prepared compositions are free from gellation over many months, assuring suitable shelf life.

The ester is soluble in numerous common solvents such as the xylenes, high-solvency naphtha and like solvents for baking enamel. It is compatible with nitrocellulose, vinyl acetate polymers, copolymers of vinyl acetate and vinyl chloride, copolymers of vinyl chloride and acrylonitrile, acrylic acid esters, and allyl alcohol esters such as diallylphthalate and diallylmaleate.

As an article of commerce it is comparable to oil-modified alkyd resins in being subject to curing in the presence of cross-linking promoters. Such promoters include well-known cross-linking amines and certain metal salts. The promoters may be incorporated with the resinous ester, with or without solvent, to form stable heat-curing compositions, useful as clear films, or as bases for inclusion of pigments to provide enamels.

The cross-linking amine promoters for the present invention are those having two or more amine groups, any one or all of which may be primary, secondary or tertiary. Amine resins are preferred as promoters to augment the resinous character of the product. Among the suitable amines are: tetraethylene pentamine, triethylene tetramine, diethylene triamine, ethylene diamine, and condensation products such as alkylated resins of urea-formaldehyde, melamine - formaldehyde, and triazine - formaldehyde, where the alkyl group has from 4 to 10 carbon atoms.

The metal salt promoters include well known driers. It has been found that certain salts promote cross-linking. The rare metal salts of cerium and lanthanum and ordinary salts of cobalt and manganese, in the form of naphthenates and hexoates, singly or mixed, may be used to promote cross-linking, presumably being catalytic and not reagents.

The properties of the heat-cured coating, developing from any particular polyester of this invention, depend upon the amount of cross-linking promoter employed. The latter may vary from 0 to 40 parts to 100 to 60 parts of the resinous polyester.

As commercial products the polyester with or without added promoter is thinned to a 50%-solids solution with a suitable solvent, preferably xylene. So provided it is suitable for clear coatings, and for milling into it suitable pigments. By limiting the acid number of the polyester to a range from 0 to 10, it is not necessary to caution the consumer as to limitations applicable to pigments and shelf life.

EXAMPLE 1

|  | Parts by weight |
|---|---|
| Phthalic anhydride | 1875 |
| Adipic acid | 1875 |
| Glycerol | 1700 |
| Glycidyl-para-tertiary-butyl-phenyl-ether | 4400 |

The above materials are charged into a reaction vessel equipped with agitator and reflux condenser and gradually heated to 400° F. The esterification progresses rapidly and the acid number of the product gradually decreases. A temperature in the range from 350° to 450° F. is maintained for 3 to 4 hours and until an acid number from 0 to 20, but preferably from 0 to 10 is obtained, and until the reaction mass has a viscosity, tested as a 50%-solids solution in xylene, within the range from T to $Z_3$ on the Gardner-Holdt viscosity scale at 77° F. The resulting reaction mass is a viscous balsam-like fluid stable under ordinary conditions. When applied to a glass plate and exposed to air and light at room temperature, no visible change occurs. At elevated temperatures in the range from 300° to 400° F., the resinous material converts gradually into a pale elastic film.

By adding a cross-linking promoter, as is generally practiced in consuming use of the resinous product, there is readily formed an extremely hard elastic, chemically resistant, tough, non-yellowing film or coating which has remarkable adhesion to surfaces of metal, glass, wood and other materials. The character of the final heat-reacted product varies with the amount and kind of cross-linking promoter included for the final thermosetting. From 0 to 40 parts of cross-linking promoter to 60 parts of polyester acid may be used, the reactive promoters being used preferably in larger amount in said range, and the catalytic promoters being effective in small amounts.

The resinous material of Example 1 may be an article of commerce for compounding and use by consumers in the finishing trades. It is soluble in aromatic hydrocarbons, esters and ketones. It has a limited tolerance for alcohols. It is insoluble in aliphatic hydrocarbons. Both with and without a cross-linking promoter, the resinous material is compatible with nitrocellulose lacquers, vinyl resin solutions, and some short-oil alkyds and varnishes. It is incompatible with cellulose acetate and ethylcellulose solutions. As a commercial product the composition with or without promoter is preferably standardized in a solution of 50% solids by weight.

EXAMPLE 2

| | Parts by weight |
|---|---|
| Phthalic anhydride | 2815 |
| Adipic acid | 935 |
| Glycerol | 1850 |
| Glycidyl para octyl phenyl ether | 4400 |

The above materials are processed as described in Example 1. The resulting viscous resin is soluble in aromatic hydrocarbons and miscible in all proportions with a number of amine resins, nitrocellulose, and vinyl resins. By incorporating 30 parts of an amine cross-linking promoter to 70 parts of resin solids, the material may be quickly heat-cured to produce pigmented and unpigmented films which are glossy, smooth, tough and elastic, in a matter of minutes. The higher the temperature the shorter the time of cure, for example, 15 minutes at 200° F., 10 minutes at 300° F. and 5 minutes at 400° F. At higher temperatures a flash cure may be effected as in a matter of seconds at 500° to 600° F. without discoloration, thus enabling the conduct of industrial operations at high speeds heretofore unavailable.

EXAMPLE 3

| | Parts by weight |
|---|---|
| Phthalic anhydride | 2815 |
| Sebacic acid | 1000 |
| Glycerol | 850 |
| Pentaerythritol (technical grade) | 600 |
| Glycidyl para tertiary nonyl phenyl ether | 5000 |

These materials are processed as in Example 1 and the material has the same properties as described for Examples 1 and 2. When mixed with a cross-linking promoter, the material is specially recommended as a lacquer for wood and metal.

EXAMPLE 4

| | Parts by weight |
|---|---|
| Tetrahydrophthalic anhydride | 3000 |
| Adipic acid | 500 |
| Sebacic acid | 200 |
| Azelaic acid | 200 |
| Pentaerythritol (technical grade) | 1000 |
| Glycerol | 600 |
| Glycidyl para tertiary amyl phenyl ether | 5000 |

Materials are reacted as in Example 1. The resulting balsam-like resin is soluble in aromatic hydrocarbons, esters, ketones and cellosolves. It has the same solubilities and compatibilities as the resins of the previous examples, and may be similarly heat cured with cross-linking promoters.

EXAMPLE 5

| | Parts by weight |
|---|---|
| Terephthalic acid | 2250 |
| Sebacic acid | 1000 |
| Glycerol | 950 |
| Para tertiary butyl phenyl glycidyl ether | 5000 |

The above materials are processed as in Example 1.

EXAMPLE 6

| | Parts by weight |
|---|---|
| Phthalic anhydride | 2815 |
| Methacrylic acid | 1400 |
| Glycerol | 1000 |
| Para cresyl glycidyl ether | 5500 |

The above materials are processed as in Example 1. In place of methacrylic acid, acrylic acid or its anhydride, or crotonic acid, may be used.

EXAMPLE 7

| | Parts by weight |
|---|---|
| Phthalic anhydride | 2500 |
| Sebacic acid | 1000 |
| Maleic anhydride | 200 |
| Ethylene glycol | 100 |
| Pentaerythritol (technical grade) | 100 |
| Para tertiary octyl phenyl glycidyl ether | 6000 |

The above materials are processed as in Example 1.

EXAMPLE 8

| | Parts by weight |
|---|---|
| Phthalic anhydride | 1875 |
| Adipic acid | 1875 |
| Pentaerythritol (technical grade) | 1700 |
| Glycidyl-para-octyl phenyl ether (technical grade) | 4400 |
| High solvency naphtha | 400 |

The above materials are charged into a closed vessel equipped with agitator, condenser and receiver from which the solvent distilled away may be returned to the reaction vessel. The mass is heated to a temperature of 350° to 370° F., at which temperature the azeotropic mixture of solvent and water distills over into the receiver, wherein the solvent and the water separate. The solvent phase is returned to the reaction vessel and the water phase discarded. This process is continued until an acid number in the range from 0 to 20 is found to exist in the reaction mass, and until a solution of the reaction mass in an equal weight of high solvency naphtha has a viscosity within the range of T to $Z_3$, as described. When these conditions exist, the reaction mass is reduced to 50% solids by the addition of xylene or more naphtha.

EXAMPLE 9

To 70 parts by weight of a 50%-solids solution of the reaction product of Example 1 are added 30 parts by weight of a 50% xylene solution of butylated urea-formaldehyde condensation product. This forms a clear, stable solution which converts to a hard, elastic chemically resistant, tough, non-yellowing coating upon heating at 300° F. for 30 minutes.

EXAMPLE 10

To 97 parts by weight of the 50% resin solution produced according to Example 8 are added 3 parts by weight of tetraethylene pentamine. A clear mixture is formed which is stable at normal temperatures but converts to a tough, elastic, pale resinous material when coated on a base and heated to a temperature of 300° F. for 25 minutes.

EXAMPLE 11

To 98 parts by weight of resin-solids produced according to either Example 1 or 8 are added 2 parts by weight of cobalt naphthenate analysing 6% in cobalt. A clear homogeneous mixture is thus formed when cast on a receiving base such as glass or metal. When exposed at 400° F. for a time in the range from 10 to 15 minutes a tough, elastic film is formed which has excellent adhesion, elasticity and chemical resistance. In place of the cobalt naphthenate there may be used cobalt hexoate or various mixtures of cobalt and manganese naphthenates and hexoates. If desired, either cerium or lanthanum metals may replace the cobalt or manganese in the above salts, all used as cross-linking promoters. The films produced are highly resistant to marring and have an extremely smooth surface.

EXAMPLE 12

| | Parts by weight |
|---|---|
| Phthalic anhydride | 1480 |
| Azelaic acid | 940 |
| Glycerol | 460 |
| Glycidyl para nonyl phenyl ether (technical grade) | 5520 |

The above materials may be processed as in Example 1, and in the event that solvent is added in addition it is processed according to Example 8. The resulting resin is then diluted to 50% solids by addition of high solvency naphtha. For cross-linking, an amine may be used or the catalytic metal salts. As an example of an amine, from 90 to 60 parts of the naphtha solution of the resin are mixed with from 10 to 40 parts of 50% solids solution of a butylated melamine-formaldehyde resin in xylene, to provide a heat-curing composition. In the case of a metal salt, any one of those already described may be used alone or in a mixture in quantity from 0.1 to 3.0 parts by weight to 99.9 to 97 parts by weight of resin solids.

When the above heat-curing compositions are applied to a base of glass, metal or wood, and exposed for 30 to 45 minutes at 300° to 400° F., the resulting films have high gloss, excellent adhesion, chemical resistance, and original color retention on prolonged heating. Pigments may be included to produce excellent enamels and primers. Where the polyester resin has an acid number in the range from 10 to 20, the pigments should not be those such as the oxides of zinc, iron or lead. However, for any acid number up to 20, many common pigments may be used such as tetanium dioxide, calcium carbonate, lithopone, carbon black, zinc chromate, and lead chromate.

EXAMPLE 13

| | Parts by weight |
|---|---|
| Terephthalic acid | 1660 |
| Sebacic acid | 2020 |
| Pentaerythritol (technical grade) | 680 |
| Glycidyl para octyl phenyl ether | 3720 |
| Xylene | 800 |

The above materials are heated to 450° F. and chemically processed as described under Example 8. When or after the acid number reaches a value of 20 as determined by titration of a specimen with N/5 KOH solution, and when the viscosity reaches a value in the range from Z to $Z_3$ on the Gardner-Holdt scale, tested as a 50%-solids solution in xylene at 77° F., the condensation is discontinued and the mass reduced to 50% solids by additional xylene. The solution is clear and bright. For heat-curing compositions, the solution may be mixed with any of the amine promoters or the metal salt promoters, and in particular with butylated resin of urea-formaldehyde or melamine-formaldehyde, or di-, tri-, or tetraethylene polyamine, using such amine in amount up to 40 parts by weight to 60 parts by weight of resin solids. Such compositions may be cured in from 30 to 60 minutes at 250° to 350° F.

EXAMPLE 14

| | Parts by weight |
|---|---|
| Isophthalic acid | 1660 |
| Succinic acid | 1180 |
| Benzoic acid | 610 |
| Glycerol | 920 |
| Glycidyl para-phenyl-phenyl ether | 4520 |

The above materials may be processed as in Example 1; or with the addition of 500 parts by weight of xylene they may be heated to 430° F. and mechanically processed as described under Example 8. When the acid number reaches a value in the range from 0 to 20 and the reaction mass tested at 50%-solids in xylene has a viscosity in the range from U to V (Gardner-Holdt scale), the mass is cooled to 250° F. and diluted with xylene to 50% solids. The resulting resin solution is slightly yellow, clear and bright. The resin may be used with cross-linking promoters in the same way as described for the products of other examples.

EXAMPLE 15

| | Parts by weight |
|---|---|
| Phthalic anhydride | 1480 |
| Methacrylic acid | 430 |
| Glycerol | 644 |
| Glycidyl para benzyl phenyl ether | 4800 |

The above materials are heated at 400° to 450° F. until any selected acid number in the range from 0 to 20 is attained and the product has a selected Gardner-Holdt viscosity in the range from X to $Z_1$ when tested at 50% solution in xylene. At the end of the reaction the mass is cooled to 300° F. and diluted with xylene to 50% resin solids. The resulting solution is clear and bright and subject to heat-curing by the addition of amine or metallic salt cross-linking promoters.

EXAMPLE 16

| | Parts by weight |
|---|---|
| Beta pinene maleic anhydride adduct | 2000 |
| Salicylic acid | 100 |
| Crotonic acid | 500 |
| Pentaerythritol (technical grade) | 650 |
| Sorbitol | 800 |
| Glycidyl para tertiary capryl phenyl ether | 8000 |

The above materials are processed at 400° F. as under Example 1 until a desired acid number in the range from 0 to 20 is found and a desired Gardner-Holdt viscosity in the range from X to $Z_1$ tested as described before. Then the reaction mass is cooled to 300° F. and reduced to 50% resin solids by addition of xylene. The solution obtained is clear and bright and may be mixed with resinous chemical and metallic soap cross-linking promoters and with short-oil resins.

EXAMPLE 17

By using in Example 16 for the dibasic acid, the adduct of maleic anhydride and alpha terpinene (a Diels-Alder reaction product), a similar resin results, having, however, an ethylenic unsaturation in the dibasic acid, because of the conjugated double bond in the alpha terpinene.

EXAMPLE 18

| | Parts by weight |
|---|---|
| Phthalic anhydride | 2500 |
| Sebacic acid | 1000 |
| Maleic anhydride | 200 |
| Ethylene glycol | 100 |
| Pentaerythritol (technical grade) | 100 |
| Para teritiary octyl phenyl glycidyl ether | 6000 |

The above materials are processed as in Example 1 and may be used in the same way as any of the condensation products above described.

EXAMPLE 19

| | Parts by weight |
|---|---|
| Adipic acid | 3800 |
| Diglycerol | 1800 |
| Glycidyl para tertiary phenyl ether | 4400 |

The materials are processed as in Example 1 to an acid number in the range from 1 to 20 and a Gardner-Holdt viscosity (at 77° F. in 50% solids solution in xylene) of T to V.

The dibasic acid material may be a single one or a mixture, but all of those which may be present in a mixture are not suitable for use singly. Those described and illustrated in the examples may be divided into lists as follows:

*List a.*—Phthalic, isophthalic, terephthalic, di-, tetra- and hexa-hydrophthalic and tetrahydroisophthalic acids and any of their anhydrides;

*List b.*—Saturated open-chain aliphatic dibasic acids having from 4 through 10 carbon atoms and any of their anhydrides;

*List c.*—Saturated and unsaturated addition-reaction products of unsaturated compounds having at least one ethylenic double bond with a compound selected from the following list (d); such products being unsaturated Diels-Alder reaction products where the said unsaturated compound has two conjugated double bonds;

*Optional list d.*—Fumaric, maleic, itaconic and aconitic acids and any of their anhydrides.

Single selections are illustrated in Examples 6, 15, 16, 17 and 19. The best results are achieved with a mixture of material selected at least from list a and list b, as shown in Examples 1 to 5, 7, 8, 12 to 14 and 18.

The same situation exists in reference to the polyhydric alcohol. All those which may be present in a mixture are not suitable for use singly. Those which may be used singly are glycerol, diglycerol and the pentaerythritols. The auxiliary ones are ethylene glycol (Examples 7 and 16) and sorbitol (Example 16).

The value of any final resin of the present invention varies with the specific formulation in esterification and also with the kind and quantity of cross-linking promoter. For the purpose of illustration, one baked resin is compared below with certain conventional resins. In the following comparisons resin A derives from a polyester made in accordance with Example 1 having an acid number of 10 using as the cross-linking promoter butylated melamine formaldehyde resin in the amount by weight of 20 parts to 80 parts of the acid polyester, these materials being present at a 50%-solids solution in xylene.

Resin B is a solution at 50% solids and containing 43% by weight of alkyd resin deriving from phthalic anhydride, glycerol and soyabean oil, which is present with a butylated melamine formaldehyde resin as cross-linking promoter.

Resin C is similar to resin B except that in place of soyabean oil there is employed dehydrated castor oil.

Test No. 1.—Gloss, color and hardness

Enamels were made from resin solutions A, B and C by identical formulas and coated onto glass plates with a 3 millimeter Bird applicator. The plates were baked at 300° F. for 10 minutes in a ventilated oven. The baked plates were evaluated as follows:

| Resin | 60° Gloss | Color Rating | Sward Hardness |
|---|---|---|---|
| A | 98 | 1 | 42 |
| B | 74 | 2 | 24 |
| C | 99 | 1 | 28 |

Test No. 2.—Accelerated yellowing

The enamels used in Test No. 1 as baked on the plates in Test No. 1 were subjected to induced yellowing by exposure in a closed cabinet at room temperature to an atmosphere heavy with ammonia, for five hours in one set and 24 hours in another set. The results were evaluated as follows, the lower number 1 indicating the best result and no discoloration:

| Resin | Initial Color | 5 hours' exposure | 24 hours' exposure |
|---|---|---|---|
| A | 1 | 1 | 1 |
| B | 2 | 4 | 4 |
| C | 1 | 3 | 3 |

Color retention was visually rated. Number 1 is best and indicates no discoloration.

Test No. 3.—Accelerated yellowing and loss of gloss

The same enamels of Test No. 1 were heated at 200° F. for the periods stated in the table below:

| Resin | Initial gloss 60° | 60° gloss after— | | Discoloration after 24 hours, 60° |
|---|---|---|---|---|
| | | 24 hours | 48 hours | |
| A | 98 | 97 | 97 | 1—no discoloration. |
| B | 68 | 55 | 54 | 4—bad discoloration. |
| C | 96 | 92 | 93 | 2—pronounced discoloration. |

Test No. 4.—Chemical resistance

The enamels of Test No. 1 were coated onto new test tubes and baked for 10 minutes at 300° F. One set of these was immersed in a 10% solution of caustic soda at room temperature. Resin A was not damaged after 48 hours. Resin B was destroyed in one hour. Resin C was destroyed in 3 hours.

Another set of these coated test tubes was immersed in a 3% solution of caustic soda at room temperature. Resin A was undamaged after 120 hours. Resin B was completely destroyed in 5 hours. Resin C was completely destroyed in 24 hours.

Another set of these coated tubes was immersed in boiling water. Resin A was intact after 2 hours and at the end of 4 hours showed some blisters. Resin B showed blisters in 2 hours and in 4 hours the coating was completely removed. Resin C showed slight blistering in 2 hours, and in 4 hours exhibited more blisters and cracks.

From the foregoing it is evident that the vegetable oil content in resins B and C is more detrimental to high quality in the resin than are the glycidyl ethers of the present invention.

The ratios of composition may be varied within a wide range. Taking the dibasic acids as "acids," the polyhydric alcohol as "alcohol," and the epoxy compound as "ether," all the above identified examples have been converted to mole percentages, as given in Table I below:

TABLE I

| Example | M% Acids | M% Alcohol | M% Ether |
|---|---|---|---|
| 1 | 39.0 | 28.3 | 32.7 |
| 2 | 40.2 | 31.7 | 28.1 |
| 3 | 42.2 | 24.1 | 33.7 |
| 4 | 41.1 | 22.3 | 36.6 |
| 5 | 34.8 | 19.5 | 45.7 |
| 6 | 44.3 | 13.7 | 42.0 |
| 7 | 47.3 | 4.7 | 48.0 |
| 8 | 45.7 | 22.4 | 31.9 |
| 12 | 36.6 | 12.2 | 51.2 |
| 13 | 50.0 | 12.5 | 37.5 |
| 14 | 45.5 | 18.2 | 36.3 |
| 15 | 34.7 | 16.7 | 47.6 |
| 16 | 28.2 | 17.6 | 54.2 |
| 18 | 47.3 | 4.7 | 48.0 |
| 19 | 44.7 | 18.7 | 36.6 |

Table II below shows those examples having the highest and lowest mole percentages of the three principal ingredients of Table I. If all the data of Table I is plotted on triangular coordinates, a straight line from Examples 7–18 to Example 16 includes on it Example 12. A straight line from Example 16 to Example 2 includes on it Example 1. Examples 2, 8 and 13 are nearly a straight line, but are presented as two straight lines to define an area completed by a straight line from Example 13 to Examples 7–18. All the other examples are well distributed within the area.

Accordingly, the preferred embodiments of the invention are those falling on and within the boundaries of such area formed by a continuous line on the compositions of Examples 7–18, 6, 2, 8, 13 and 7–18 of Table I. Table II sets out these points which determine said area.

TABLE II

| Example | M% Acids | M% Alcohol | M% Ether |
|---|---|---|---|
| 7–18 | 47.3 | 4.7 | 48.0 |
| 16 | 28.2 | 17.6 | 54.2 |
| 2 | 40.2 | 31.7 | 28.1 |
| 8 | 45.7 | 22.4 | 31.9 |
| 13 | 50.0 | 12.5 | 37.5 |

Table III shows the highest and lowest mole percentages as found in Table II (and also Table I).

TABLE III

| | High M% | Low M% |
|---|---|---|
| Acids | 50.0 | 28.2 |
| Alcohol | 31.7 | 4.7 |
| Ether | 54.2 | 28.1 |

It is to be understood that the present invention is not limited to or by the specific examples herein given for the purpose of illustration, and that other embodiments of the invention are contemplated as following within the scope of the appended claims.

I claim:

1. The method of forming a heat-curing fluid composition which consists of heating and condensing to a polyester, reactive dibasic acid material including essentially such material selected from the group consisting of (a) phthalic, isophthalic, terephthalic, di-, tetra- and hexa-hydrophthalic and tetrahydroisophthalic acids and any of their anhydrides, (b) saturated open-chain aliphatic dibasic acids having from 4 through 10 carbon atoms and any of their anhydrides, and (c) saturated and unsaturated addition-reaction products of unsaturated compounds having at least one ethylenic double bond with material selected from the group consisting of fumaric, maleic, itaconic and aconitic acids and any of their anhydrides; reactive polyhydric alcohol including essentially such material selected from the group consisting of glycerol, diglycerol, and mono-, di-, and tri-pentaerythritol; and ethers of glycidol with monohydroxy benzene having a single hydrocarbon substituent selected from the group consisting of alkyl, aryl and aralkyl radicals; and arresting the condensation when the reaction mass acquires an acid number in the range from 0 to 20.

2. The method of forming a heat-curing fluid composition which consists of heating and condensing to a polyester, reactive dibasic acid material selected from the group consisting of (a) phthalic, isophthalic, terephthalic, di-, tetra- and hexa-hydrophthalic and tetrahydroisophthalic acids and any of their anhydrides, (b) saturated open-chain aliphatic dibasic acids having from 4 through 10 carbon atoms and any of their anhydrides, and (c) saturated and unsaturated addition-reaction products of unsaturated compounds having at least one ethylenic double bond with material selected from the group consisting of fumaric, maleic, itaconic and aconitic acids and any of their anhydrides; reactive polyhydric alcohol including essentially such material selected from the group consisting of glycerol, diglycerol, and mono-, di-, and tri-pentaerythritol; and ethers of glycidol with monohydroxy benzene having a single hydrocarbon substituent selected from the group consisting of alkyl, aryl and aralkyl radicals; and arresting the condensation when the reaction mass acquires an acid number in the range from 0 to 10.

3. A resinous polyester having an acid number in the range from 0 to 20, consisting of the product of heating and condensing to a polyester, reactive diabasic acid material including essentially such material selected from the group consisting of (a) phthalic, isophthalic, terephthalic, di-, tetra- and hexa-hydrophthalic and tetrahydroisophthalic acids and any of their anhydrides, (b) saturated open-chain aliphatic dibasic acids having from 4 through 10 carbon atoms and any of their anhydrides, (c) saturated and unsaturated addition-reaction products of unsaturated compounds having at least one ethylenic double bond with material selected from the group consisting of fumaric, maleic, itaconic and aconitic acids and any of their anhydrides; reactive polyhydric alcohol including essentially such material selected from the group consisting of glycerol, diglycerol, and mono-, di-, and tri-pentaerythritol; and ethers of glycidol with monohydroxy benzene having a single hydrocarbon substituent selected from the group consisting of alkyl, aryl and aralkyl radicals.

4. A resinous polyester having an acid number in the range from 0 to 10, consisting of the product of heating and condensing to a polyester, reactive dibasic acid material including essentially such material selected from the group consisting of (a) phthalic, isophthalic, terephthalic, di-, tetra- and hexa-hydrophthalic and tetrahydroisophthalic acids and any of their anhydrides, (b) saturated open-chain aliphatic dibasic acids having from 4 through 10 carbon atoms and any of their anhydrides, (c) saturated and unsaturated addition-reaction products of unsaturated compounds having at least one ethylenic double bond with material selected from the group consisting of fumaric, maleic, itaconic and aconitic acids and any of their anhydrides; reactive polyhydric alcohol including essentially such material selected from the group consisting of glycerol, diglycerol, and mono-, di-, and tri-pentaerythritol; and ethers of glycidol with monohydroxy benzene having a single hydrocarbon substituent selected from the group consisting of alkyl, aryl and aralkyl radicals.

5. The method of claim 1 in which is included for the reaction material selected from the group consisting of fumaric, maleic, itaconic and aconitic acids and any of their anhydrides.

6. The method of claim 1 in which is included for the reaction material selected from the group consisting of ethylene glycol and sorbitol.

7. The method of claim 1 in which is included for the reaction material from the group consisting of fumaric, maleic, itaconic and aconitic acids and any of their anhydrides, and also material selected from the group consisting of ethylene glycol and sorbitol.

8. The method of claim 1 in which is included for the reaction material selected from the list *a* and the list *b*.

9. The product of claim 3 in which there is included for the reaction material from the group consisting of fumaric, maleic, itaconic and aconitic acids and any of their anhydrides.

10. The product of claim 3 in which there is included for the reaction material selected from the group consisting of ethylene glycol and sorbitol.

11. The product of claim 3 in which there is included for the reaction material selected from the group consisting of fumaric, maleic, itaconic and aconitic acids and any of their anhydrides, and also material from the group consisting of ethylene glycol and sorbitol.

12. The product of claim 3 in which there is included for the reaction material selected from the list *a* and the list *b*.

References Cited in the file of this patent

UNITED STATES PATENTS

| | | |
|---|---|---|
| 2,606,883 | Hoover | Aug. 12, 1952 |
| 2,653,142 | Cody et al. | Sept. 22, 1953 |
| 2,659,710 | Martin | Nov. 17, 1953 |